(12) United States Patent
Burky et al.

(10) Patent No.: US 7,095,420 B2
(45) Date of Patent: Aug. 22, 2006

(54) SYSTEM AND RELATED METHODS FOR SYNTHESIZING COLOR IMAGERY

(75) Inventors: John J. Burky, Uniontown, OH (US); Rosemarie Hanus, Akron, OH (US)

(73) Assignee: Lockheed Martin Corporation, Akron, OH (US)

( * ) Notice: Subject to any disclaimer, the term of this patent is extended or adjusted under 35 U.S.C. 154(b) by 449 days.

(21) Appl. No.: 10/272,819

(22) Filed: Oct. 17, 2002

(65) Prior Publication Data

US 2004/0075667 A1 Apr. 22, 2004

(51) Int. Cl.
G09G 5/02 (2006.01)
(52) U.S. Cl. ............... 345/589; 345/593; 345/597; 345/630; 382/162; 358/500; 209/580
(58) Field of Classification Search ............... 345/589, 345/593–597, 600, 629–630, 690; 348/502, 348/504, 519–520, 539, 557, 560, 562, 582; 382/162–167; 358/500, 515–519; 209/3.3, 209/580–581
See application file for complete search history.

(56) References Cited

U.S. PATENT DOCUMENTS

| | | | | |
|---|---|---|---|---|
| 4,998,144 A | * | 3/1991 | Karn | 399/184 |
| 5,415,549 A | * | 5/1995 | Logg | 434/38 |
| 5,761,385 A | | 6/1998 | Quinn | 395/22 |
| 5,761,646 A | * | 6/1998 | Frid-Nielsen et al. | 705/9 |
| 5,786,823 A | * | 7/1998 | Madden et al. | 345/591 |
| 6,211,971 B1 | * | 4/2001 | Specht | 358/1.9 |
| 2002/0079249 A1 | * | 6/2002 | Lawandy et al. | 209/3.3 |
| 2003/0006170 A1 | * | 1/2003 | Lawandy | 209/3.3 |

* cited by examiner

Primary Examiner—Matthew C. Bella
Assistant Examiner—Wesner Sajous
(74) Attorney, Agent, or Firm—Renner Kenner Greive Bobak Taylor & Weber

(57) ABSTRACT

A system and related method for synthesizing natural color ground or landcover imagery for a predetermined project area, includes the steps of inputting a high-resolution natural color sample of a sample area contained within the project area. Next, a multispectral image of the sample area, where the multispectral image has a plurality of feature types, is also input. This generates a color palette for each of the plurality of feature types. The color palettes are applied to a multispectral image of the project area to generate a low-resolution natural color image which is then combined with a high resolution panchromatic image of the project area to generate a high-resolution natural color image of the project area.

19 Claims, 8 Drawing Sheets
(3 of 8 Drawing Sheet(s) Filed in Color)

SYSTEM AND RELATED METHODS FOR SYNTHESIZING COLOR IMAGERY

TECHNICAL FIELD

Generally, the present invention is directed to a system and method for generation of a large area database comprised of natural color ground or landcover imagery. Specifically, the present invention is directed to a large area database generated with minimal cost using readily available large area imaging techniques. In particular, the present invention is directed to a large area database wherein a sampling of a high-resolution natural color image of the large area is combined with multispectral images and a high-resolution panchromatic image of the large area to generate a high-resolution natural color image.

BACKGROUND ART

Large area databases are used for out-the-window scenes in aircraft simulators. Typically such out-the-window visual systems incorporate high-resolution image insets combined with a generic or low resolution background. In other words, high-resolution images are provided for critical landcover scenes or objects such as buildings or cities and the remaining scenes are filled in with low-resolution graphics or crude polygon images. It will be appreciated that the out-the-window scenes are used to provide the trainee with as life-like experience as possible so as to enhance the training simulation. Low-resolution background images can in fact detract from the training experience and result in negative training for the trainee. Such simulators are commonly used for training aircraft pilots wherein the out-the-window scenes are combined with instrumentation used for that particular aircraft that the pilot is training for. The primary obstacle to greater use of high-resolution imagery in such simulators is the prohibitive acquisition costs of the database imagery.

Such large area databases for out-the-window visual systems typically cover 500 square kilometers. Accordingly, obtaining a high-resolution color image of such a large area would require one to hire a plane or obtain a satellite image in which the resolution is approximately ½ meter to 1.5 meters for each pixel of the image. Such a high resolution image is obtained from 35 millimeter photographs which are quite expensive to obtain for such a large area. Alternatives to photograph images can be obtained from IKONOS™ or Quick Bird™ satellite images which are digital images that are fused with natural color to provide a color image. But, these are also quite expensive. Other satellite images of a large area may also be obtained, but these typically have a resolution in the range of 25–30 meters per pixel. Accordingly, these images do not provide the high-definition required by trainees to provide an optimum training experience. Moreover, such out-the-window visual scenes must incorporate scenes that facilitate simulated take off and landing, low-altitude attacks, high-altitude attacks, bomb damage assessment and in-route operations.

Cost constraints often preclude acquiring high-resolution natural color images from aerial surveys or from satellites with high-resolution multi-band sensors. The usual solution to this high cost is the use of "pan-sharpening," which is a procedure which fuses high-resolution panchromatic imagery with low-resolution color imagery to produce high-resolution color imagery. Those skilled in the art will appreciate that panchromatic images are those that are sensitive to light of all colors in the visible spectrum. In other words, these are black and white images with the appropriate gray scale levels. Panchromatic images are commercially available at a low cost from the United States Geological Survey.

The most widely available and lowest cost source for low-resolution color imagery is Landsat's™ multi-spectral bands. These bands do not correspond exactly to the wavelengths of red, green and blue visible light and, as such, unprocessed Landsat™ imagery does not look "natural." Also the information content of the Landsat near-blue band is degraded because of atmosphere absorption at that wavelength. For both of these reasons, it is necessary to transform the Landsat multi-spectral bands to natural colors.

The standard technique for synthesis of natural color imagery is the application of a mathematical transform—usually simple image stretching and biasing—to a selected set of three of the Landsat™ bands, thus producing the three natural color red, green and blue bands. The difficulty is that no transform has been found that generates acceptable results over large areas because of the variability of the source imagery. The result is that natural color is provided for some areas and non-natural or false colors are provided for other areas. Additionally, for cases where aerial photography has been acquired for small areas, it is difficult to color-match a synthetic pan-sharpened imagery and non-synthetic imagery. In other words, transform or fusing processes result in an image that includes colors which are not naturally occurring. For example, such colors include the bright neon oranges or greens that are sometimes seen on traffic signs, but which are never encountered in out-the-window visual scenes viewed by aircraft pilots.

It will be appreciated that the existing prior art techniques to generate synthesized color imagery require the use of specified constants or "magic numbers" that are used by the stretch/bias transforms. Because of the variability of the multi-spectral imagery, it is difficult to specify constants that work acceptably over large areas. The usual result from such a process is an output consisting of both natural colors—trees and vegetation—and non-natural colors, for example, the previously referred to neon colors.

Difficulties also arise in combining the multi-spectral imagery that the "sharpening" steps used. In the past the sharpening or fusing steps required that histograms be taken of the entire image and also of third level segments without consideration of surrounding areas. In other words, a histogram would need to be taken for the entire area, another histogram taken of a smaller area and yet another series of histograms for smaller areas within the entire image area. These different levels of histograms further introduce color discontinuities that cannot be correlated when all of the images are combined. Moreover, taking so many different histograms and re-combining them uses valuable computing time in rendering the image.

SUMMARY OF THE INVENTION

Based upon the foregoing it is apparent that there is a need in the art for a system and related methods for synthesizing color imagery.

Therefore, it is a first aspect of the present invention to provide a method for synthesizing color imagery for a predetermined project area, comprising inputting a high-resolution natural color sample of a sample area contained within the project area; inputting a multispectral image of said sample area, said multispectral image having a plurality of feature types; generating a color palette for each of said plurality of feature types; applying said color palettes to a project area multispectral image to generate a low-resolution natural color image of the project area; and combining said low-resolution natural color image of the project area with a high resolution panchromatic image of the project area to generate a high-resolution natural color image of the project area.

Other aspects of the present invention are obtained by a method for generating a large-area database of color imagery, comprising extracting a plurality of color palettes from a sample area with in a project area of a natural color image of said sample area and a multispectral image of said sample area; and applying said plurality of color palettes to a multispectral image of said project area to generate a low-resolution natural color image of said project area.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, and color photographs. The file of this patent contains at least one photograph executed in color. Copies of this patent with the color photographs will be provided by the Patent and Trademark Office upon request and payment of the necessary fee.

BEST MODE FOR CARRYING OUT THE INVENTION

Figure 1:
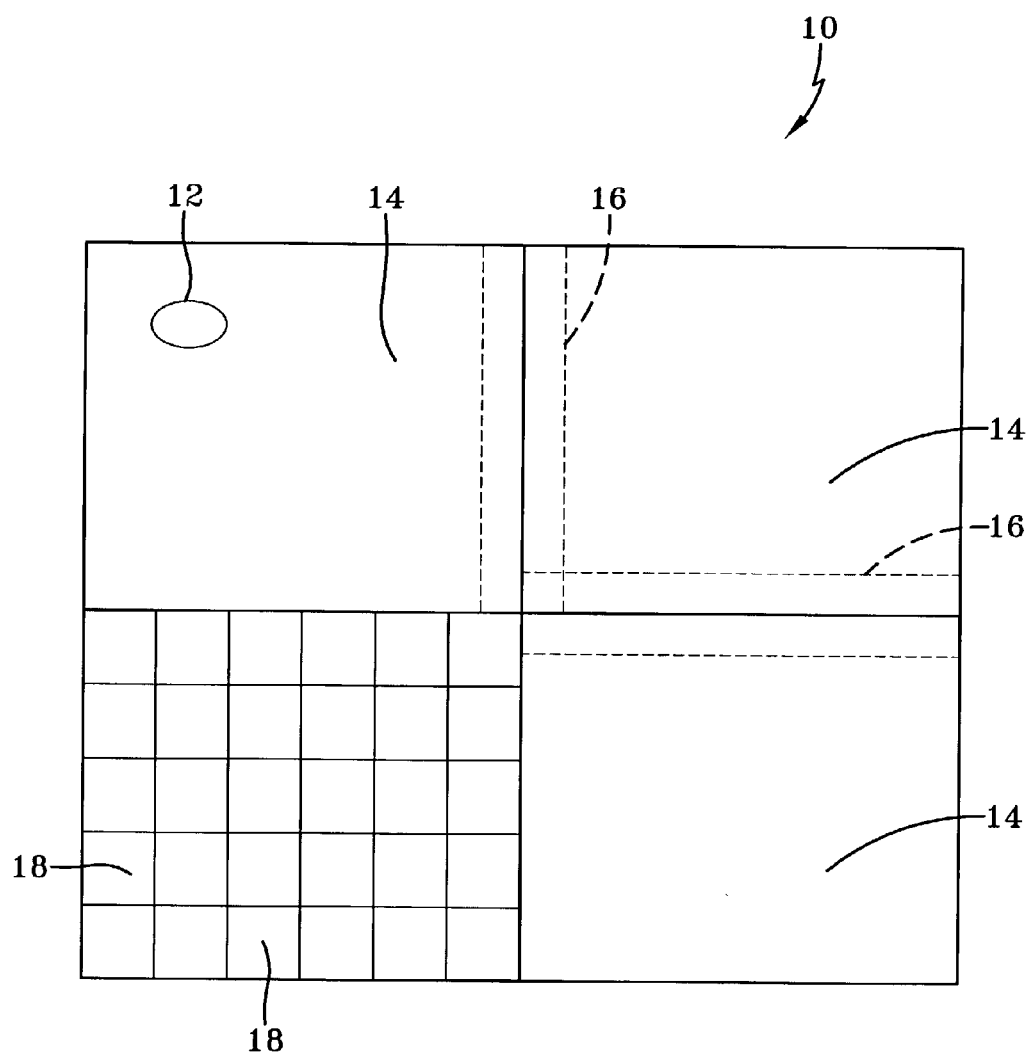
FIG. 1 is a schematic diagram of a project area and its various components.

Referring now to the drawings and in particular to FIG. 1, it can be seen that a project area is designated generally by the numeral 10. Project area 10 schematically represents a large landcover area of approximately 500 kilometers by 500 kilometers. It will be appreciated, however, that other size project areas could be used in development of a large area database according to the teachings of the present invention. The 500 kilometer squared project area is believed to be sufficient for the purpose of training pilots wherein the project area is used in an out-the-window visual display systems of a flight simulator.

To facilitate the derivation of the large area database the project area 10 has several sub-areas. A sample area 12 may be positioned anywhere in the project area 10 and is preferably representative of all the various types of structures and vegetation included in the entire project area 10. To further facilitate the derivation of the project area it may be segmented into working areas designated generally by the numeral 14. The working areas 14 are sized to be approximately 100 kilometers square although other size working areas could be utilized. An overlap working area 16 is defined by working areas 14 that are adjacent one another as will be discussed in detail later. Briefly, the overlap working area 16 is utilized to blend adjacent working areas 14 to one another such that the entire large area database, is not provided with color discontinuities. To further facilitate the processing of the large area database each working area 14 is further segmented into tiles designated generally by the numeral 18. It is believed that the size of these tiles is approximately 3 kilometers square although other size tiles could be employed.

Figure 2:
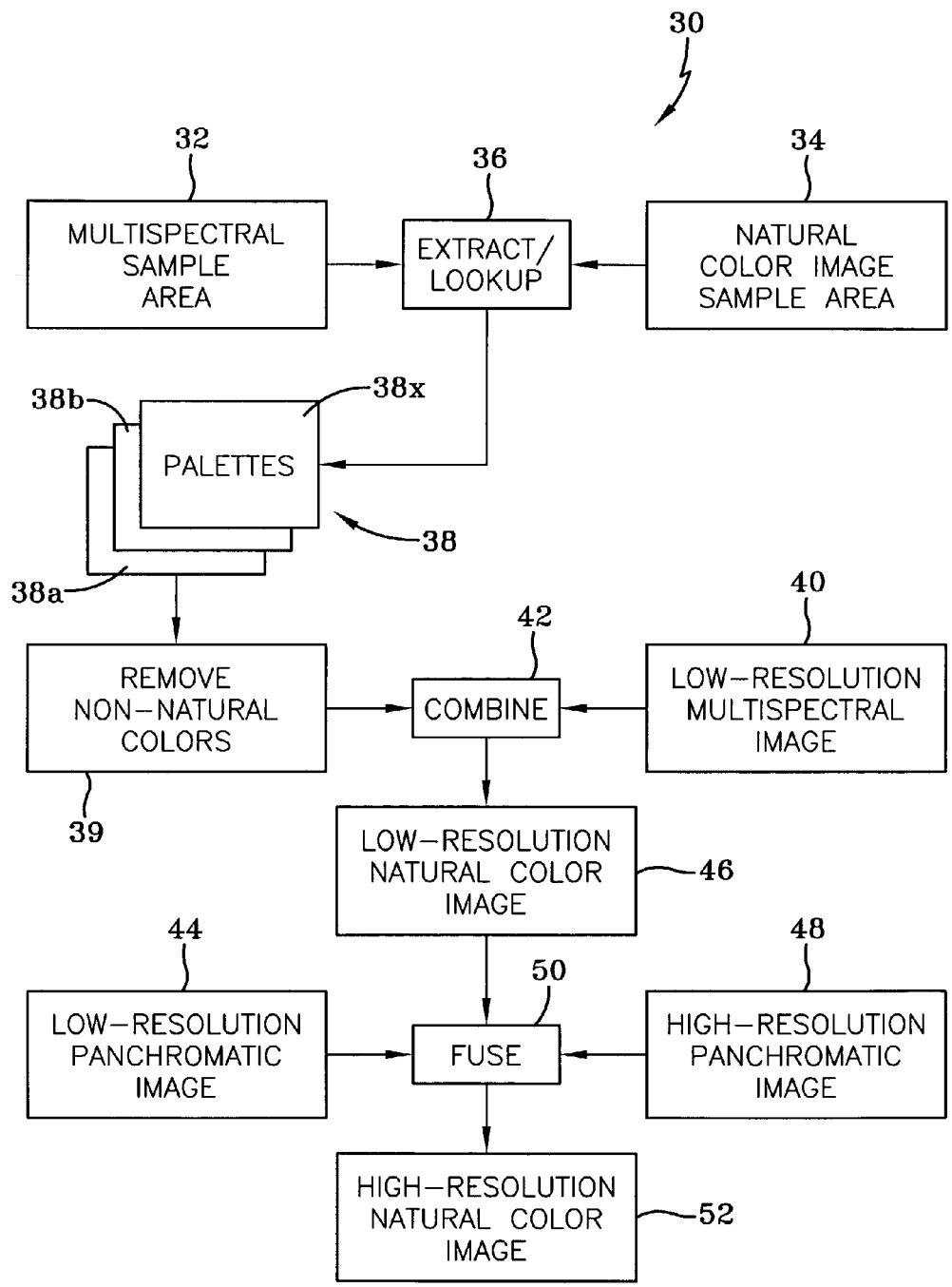
FIG. 2 is a flow chart illustrating methodology of the present invention
Figure 3:
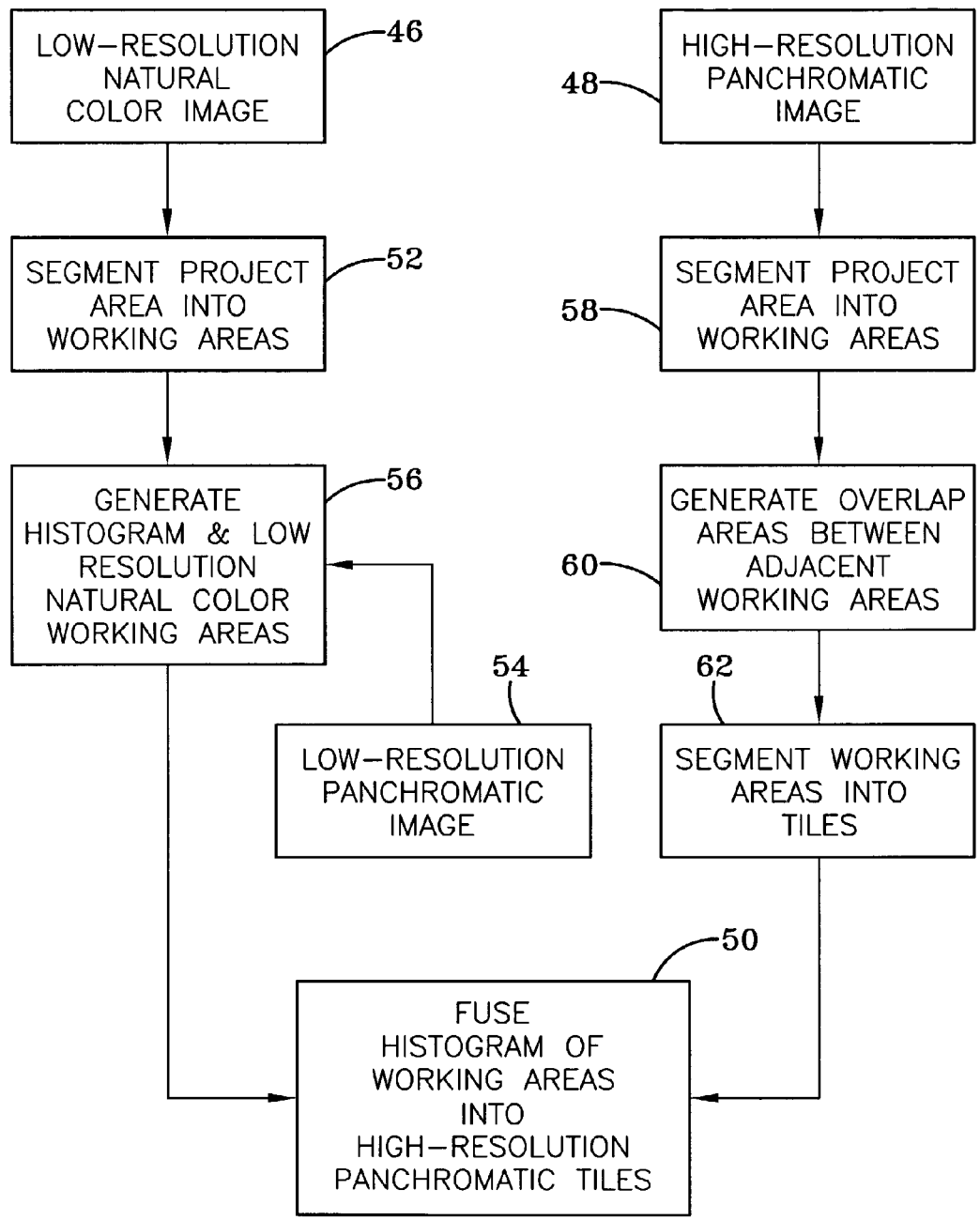
FIG. 3 is a flow chart illustrating the fusing step of the present invention.
Figure 4:
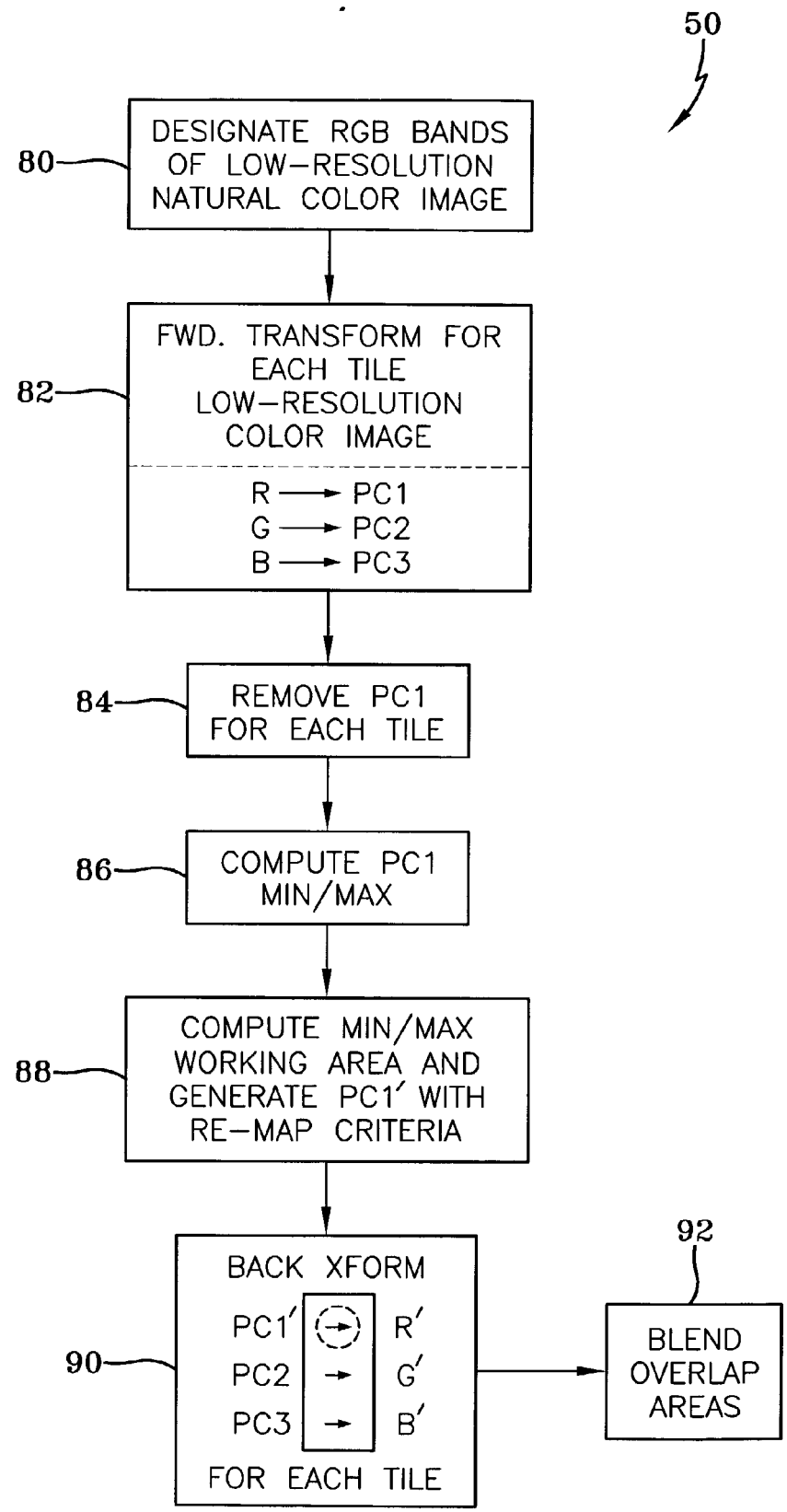
FIG. 4 shows the detailed steps required to implement the fusing step.
Figure 5:
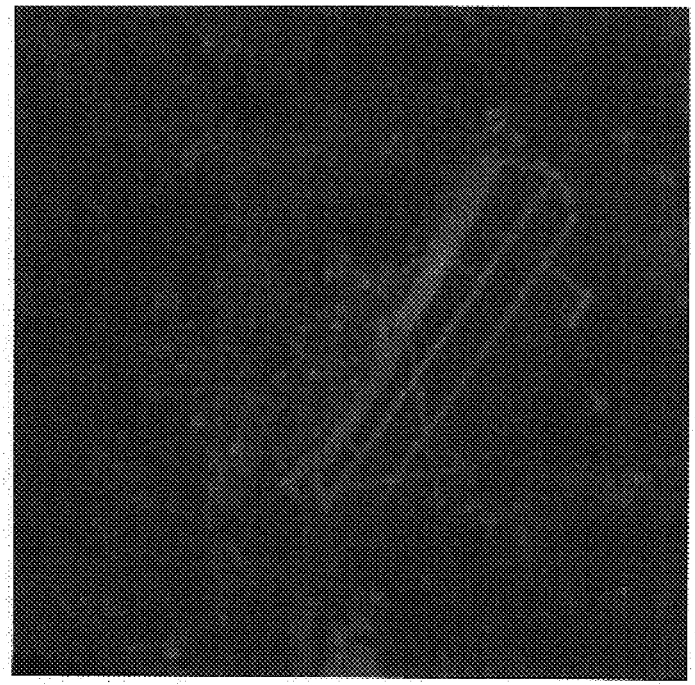
FIG. 5 is a color photograph of a multispectral image of a sample area.
Figure 6:
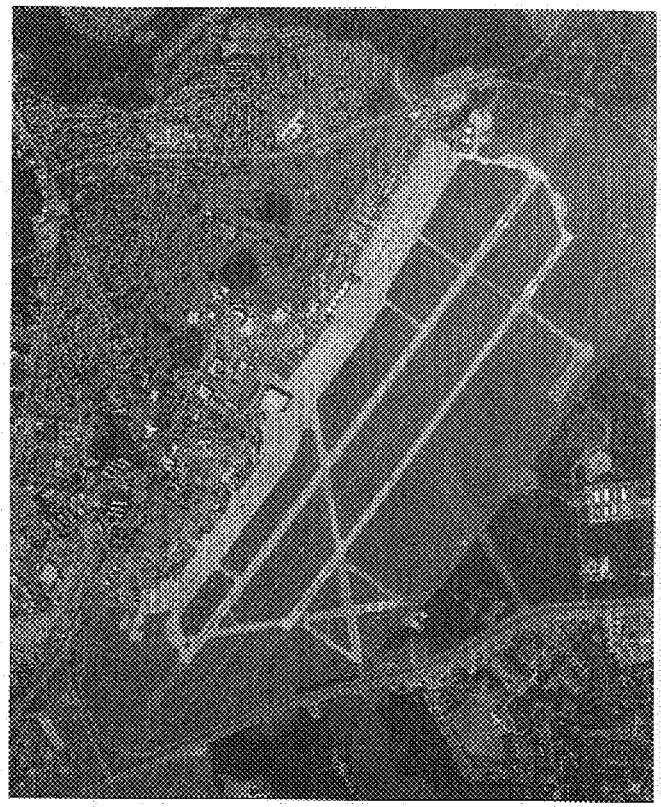
FIG. 6 is a natural color photograph of the sample area.
Figure 7:
FIG. 7 is a low-resolution multispectral image of a project area.

The processes shown and described in FIGS. 2–4 are preferably implemented on computer work stations that are commonly used with manipulation of large databases containing graphic images. An exemplary work station is any commercially available desktop PC or other work station. These work stations run imaging software such as Imagine™ by ERDAS. The work stations contain the necessary hardware, software and memory for implementing the process steps described herein. These process steps may be implemented by use of a computer-readable medium or other means well known in the art. And, where appropriate, the processes described herein are capable of receiving input—from human users, sensors or derived from available data—and utilizing and further processing the input as deemed appropriate. FIGS. 5–11 are color photographs which are exemplary of the various types of images used in the inventive process. As can be seen, the images in FIGS. 5–11 are representative of an image type, but not necessarily of the same landcover area. Although not absolutely required for understanding the processes described, it is believed that FIGS. 5–11 aid in the understanding of the disclosed process. Specific reference to FIGS. 5–11 will be made when appropriate to the discussion of FIGS. 2–4.

Referring now to FIG. 2 a flow chart which sets forth the steps for generating a large area database is designated generally by the numeral 30. The first input is designated by the numeral 32 and represents a multi-spectral image (FIG. 5) of the sample area 12. The multi-spectral image utilized in this step is typically derived from a satellite and is readily available from the United States Geological Survey or other similar agency. It is preferred that the multi-spectral image be a seven band image although it is believed that three band images could be employed. The resolution of such an image is approximately 25–30 meters per pixel. As is well documented in the art, the multi-spectral image provides information characteristics about a photographed area that is not in the visible range. Such images are easily characterized as to features and may be divided or segmented accordingly. These features are associated with an identification code for each type of feature. For example, one feature identification code can be attributed to roads, another code to cities or urban areas, another specifically to concrete and numerous others to different types of vegetation such as fields, forests, agricultural areas and the like.

The other starting input image for the methodology 30 is a natural color image 34 (FIG. 6) of the designated sample area 12. As used herein, a natural color image is a high-resolution image and is typically a 35 millimeter photograph that is taken from a plane that flies over the sample area 12 and provides a half-meter to 1.5 meter resolution for each pixel. This is a relatively high cost image to obtain and as such the sample area is typically limited to about 20 square kilometers. In general, "high-resolution" is in the range of 0.25 to 1 meter ground sample distance and "low-resolution" is in the range of 15–40 meters ground sample distance. As referred to herein, "high-resolution images" are those considered to be about 1-meter ground sample distance and "low-resolution images" are approximately 16-meters ground sample distance, wherein ground sample distance refers to a ground dimension associated with a single picture element. As will be appreciated by the skilled artisan, these specific resolutions are not an absolute requirement of the process disclosed herein.

At step 36 the inputted high-resolution natural color image (FIG. 6) and the inputted multi-spectral image (FIG. 5) of the sample area 12 are utilized to extract a plurality of color palettes 38a–x for each of the plurality of feature types provided by the multi-spectral image. In other words, for each feature identification code a range of colors is formulated. For example, vegetation typically has fewer colors whereas urban areas have more colors. An automated extraction or look-up process is used to generate the color palettes; however, it has been found that this process generates colors which are not naturally occurring. In the extracting process, for each pixel in the sample area, the pixel color is retrieved from the natural color image, and the feature type is retrieved from the multi-spectral image. The pixel color is added to that feature type's palette. For example, a pixel may have a certain shade of green and be classified as deciduous vegetation. In this case, the green color would be added to the deciduous vegetation palette. Accordingly, for the vegetation identification feature codes, very bright greens associated with non-natural colors may be generated. Based upon experience and the final area database image that would be generated using these non-natural colors, it has been determined that certain colors should be eliminated from the palettes to provide an all-natural color image as an end result. Accordingly, each palette 38a–x is preferably reviewed by an experienced practitioner at step 39 to eliminate those colors which are detrimental to the final out-the-window visual display.

Figure 8:
FIG. 8 is a low-resolution natural color image of the project area.
Figure 9:
FIG. 9 is a high-resolution panchromatic image of the project area.
Figure 10:
FIG. 10 is a high-resolution natural color image of the project area.
Figure 11:
FIG. 11 is a low-resolution panchromatic image of the project area.

Another input used in the inventive process is a low-resolution multispectral image (FIG. 7) of the area 10 designated generally by the numeral 40. The low-resolution multispectral image 40 only utilizes three bands—the near blue, red, and green bands. Typically, each of these bands is provided with approximately 10–30 levels. In order to improve the contrast of the final image, these values are "stretched" so as to provide at least 255 levels for each band. The low-resolution multispectral image is stretched so that its overall min/max range matches the min/max range of the colors in the palettes. After the stretching, the low-resolution multispectral image will still have non-natural colors. The non-natural colors in the stretched image are then matched to natural colors in the palettes, and each color in the stretched image is replaced by a known-good natural color from the palettes. This is done to accommodate the number of colors typically provided in a palette 38 and to provide a one to one correspondence which would normally result in non-natural colors being in the band, except for the actions taken in the removal step 39. In any event, a combination step 42 merges the modified palettes 38a–x with the low-resolution multispectral image 40, resulting in a low-resolution natural color image of the project area 10 designated generally by the numeral 46 (FIG. 8). This image 46 is the natural color image which is free from odd colors such as the neon colors previously referenced. However, the low-resolution natural color image derived does not provide the sharp detail required for out-the-window visual displays. Accordingly, a high-resolution panchromatic image, designated generally by the numeral 48 (FIG. 9), and a low-resolution panchromatic image 44 (FIG. 11) is fused at step 50, with the low-resolution natural color image 46 (FIG. 8) to generate a high-resolution natural color image 52 (FIG. 10). This final output is useable for the out-the-window visual displays by training simulators. The high-resolution panchromatic image 48 is a gray scale image of the project area 10 that is obtained at a relative low cost and is commercially available from the United States Geological Survey (USGS) or from other sources.

In order to properly combine the low-resolution natural color image with the high-resolution panchromatic image both images must be segmented. Accordingly, reference is now made to FIG. 3 which shows the preparation steps required to implement the fusing step 50. The low-resolution natural color image 46 (FIG. 8) of the project area is segmented into the appropriate number of working areas 14 at step 52. At step 54 a low-resolution panchromatic image (FIG. 11) of the project area 10 is provided and this image along with the working areas 14 of the low-resolution natural color image 46 are processed to generate a histogram of each corresponding image. As will be appreciated by those skilled in the art, a histogram is a table that lists how many pixels in an image are attributable to a particular gray scale value from all the pixels in an image. This data is typically plotted as a function of the gray value to determine the concentration and distribution of each gray scale value.

The high-resolution panchromatic image (FIG. 9), designated by the numeral 48, is also segmented at step 58 from the project area into a like number of working areas 16 that correspond to the same size and shape of the segments in step 52. The process, at step 60, generates the overlap areas 16 between adjacent working areas 14, the purpose of which will be described in detail below. In any event, all the working areas 14 of the high-resolution panchromatic image 48 are further segmented, at step 62, into tiles 18.

The process, at step 50, fuses the histograms of the working areas of the low-resolution natural color image and the low-resolution panchromatic image into the tiles of the high-resolution panchromatic image. This step is advantageous in that a histogram of the larger working area is taken instead of taking histograms of each tile in the high-resolution panchromatic image. This saves on processing time and also eliminates discontinuities between tiles that would arise if a histogram were taken of each individual tile.

Referring now to FIG. 4 further detail of the fusing step is generally designated by the numeral 50. At step 80, red, green and blue bands of the low-resolution natural color image 46 are designated. At step 82, each of these bands is forward transformed for each tile's low-resolution color image. In other words, the red, green and blue bands are converted to PC1/PC2/PC3 bands. At step 84, the PC1 band is removed for each tile 18 and subsequently, at step 86, the process computes the minimum/maximum range of the PC1 band. At step 88, the process calculates a minimum/maximum value of the low-resolution panchromatic image 54 to generate the histogram of each respective working area and accordingly generates a PC1' band. Step 88 also saves a re-map criteria used in generating the PC1' band. Next, at step 90, the process back transforms the PC1' band into a red prime (R') band and the same re-map criteria is used to convert the PC2 band into a green prime (G') band and the PC3 band into a blue prime (B') band for each tile of the high-resolution panchromatic image.

To complete the fusing process, the process, at step 92, blends the overlap areas 16 such that adjacent working areas 14 are provided with color continuity. The blending process is accomplished by taking the histogram of the adjacent working areas generated at step 56 and then assigning a weight value to the pixels depending upon their location in the overlap area. Accordingly, the outermost edge of an overlap area is weighted primarily toward the working area that it is predominately in. As the overlap areas shifts closer to the next adjacent working area, the weighting of the pixels is adjusted proportionately according to the distance from the outermost edge. For example, at the boundary line between adjacent working areas 14, 50 percent of the pixel weight is given to the left working area while 50 percent of the pixel weight is given to the right working area. As the overlap area shifts further to the right more weight is given to the histogram of the right working area. With this blending process, discontinuities are not readily detected by the human observer.

The advantages of the present invention are readily apparent to a person skilled in the art. In particular, the present invention allows for cost-effective and processing-efficient generation of a large area database using primarily low cost satellite images of the large area to generate a colored database which is used for out-the-window visual display of flight simulators. The foregoing process solves the problem of non-natural colors through the use of color palettes, wherein the palettes are extracted from high-resolution detailed color photography and modified to use only known-good colors. Also, because the process utilizes independent palettes for each feature identification code or type, the output color images have high contrast and look very natural. A further advantage of the present invention resides in the ability to color match all of the feature identification codes. Because the color palettes are extracted from color photography, the output images are color-matched to the original photography. This means that the process can be used to produce color-matched image mosaics that are combinations of synthetic and non-synthetic color imagery.

Still yet a further advantage of the present invention is that the use of polygons is virtually eliminated and the color information is embedded in the imagery. The process disclosed herein is also advantageous in that it can run on lower-capacity subsystems while still allowing for much of the cultural information, such as buildings, trees and street lights to be included in the out-the-window visual scenes. Yet a further advantage of the present invention is that the fusing process is facilitated by only taking histograms of the larger working areas as opposed to the tiles which further saves on computing time.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for synthesizing color imagery for a predetermined project area, comprising:
    inputting a high-resolution natural color sample of a sample area contained within the project area;
    inputting a multispectral image of said sample area, said multispectral image having a plurality of feature types;
    generating a color palette for each of said plurality of feature types based upon said high-resolution natural color sample;
    applying said color palettes to a multispectral image of the project area to generate a low-resolution natural color image of the project area; and
    combining said low-resolution natural color image of the project area with a high resolution panchromatic image of the project area to generate a high-resolution natural color image of the project area.

2. The method according to claim 1, further comprising providing said high-resolution natural color sample of said sample area with a resolution of no more than 2 meters per pixel.

3. The method according to claim 2, further comprising providing said high resolution natural color sample of said sample area with a resolution of no more than ½ meter per pixel.

4. The method according to claim 1, further comprising selecting a sample area which has colors representative of the project area.

5. The method according to claim 1, further comprising providing said multispectral image of said sample area with a resolution of no more than 35 meters per pixel.

6. The method according to claim 1, further comprising providing said multispectral image of said sample area with a range of one to seven bands in the electromagnetic spectrum.

7. The method according to claim 1, further comprising classifying said multispectral image into said plurality of feature types which may be selected from the group consisting of coniferous vegetation, urban areas, commercial areas, roads, rivers, bodies of water, agricultural vegetation, and miscellaneous vegetation.

8. The method according to claim 7, further comprising automatically assigning colors to each said palette associated with said plurality of feature types based upon said high-resolution natural color sample of said sample area.

9. The method according to claim 8, further comprising manually reviewing and deleting colors from each said palette deemed inappropriate for said feature type.

10. The method according to claim 9, further comprising providing said project area multispectral image with at least three electromagnetic spectrum bands; and
    stretching said three electromagnetic spectrum bands into a predetermined number of natural color levels for each said palette to generate said low-resolution natural color image of the project area.

11. The method according to claim 10, further comprising:
    segmenting said project area to facilitate said combining step; and
    subsequently blending said segmented project areas to provide said high-resolution natural color image without color discontinuities.

12. The method according to claim 11, further comprising:
    segmenting said low-resolution natural color image, a low resolution panchromatic image, and said high resolution panchromatic image into working areas; and
    further segmenting said working areas of said high resolution panchromatic image into a plurality of tiles.

13. The method according to claim 12, further comprising:

generating a histogram of said low-resolution natural color image and a low resolution panchromatic image over said working areas; and fusing said histogram of each said working area into said tiles of said high resolution panchromatic image.

14. The method according to claim 12, further comprising:

delineating overlap areas of said working areas that are adjacent one another; and blending said overlap areas based upon each said working area's histogram.

15. A method for generating a large-area database of color imagery, comprising:

extracting a plurality of color palettes from a sample area within a project area of an inputted natural color image of said sample area, and an inputted multispectral image of said sample area, wherein said inputted multispectral image of said sample area provides information characteristics not in the visible range; and applying said plurality of color palettes to an inputted multispectral image of said project area to generate a low-resolution natural color image of said project area.

16. The method according to claim 15, further comprising:

fusing said low-resolution natural color image of said project area with a high-resolution panchromatic image of said project area to generate the large-area database of said project area.

17. The method according to claim 16, wherein said fusing step comprises:

segmenting the large area database into a plurality of working areas to facilitate said fusing step; and subsequently blending said plurality of working areas into the large area database without color discontinuities.

18. The method according to claim 15, further comprising:

providing said multispectral image of said sample area with a resolution of no more than 35 meters per pixel.

19. The method according to claim 15, wherein said inputted multispectral image is distinct from said inputted natural color image.

* * * * *